Jan. 15, 1957 W. E. HARNESS 2,777,919
THERMOSTATIC SWITCH
Filed Jan. 11, 1954
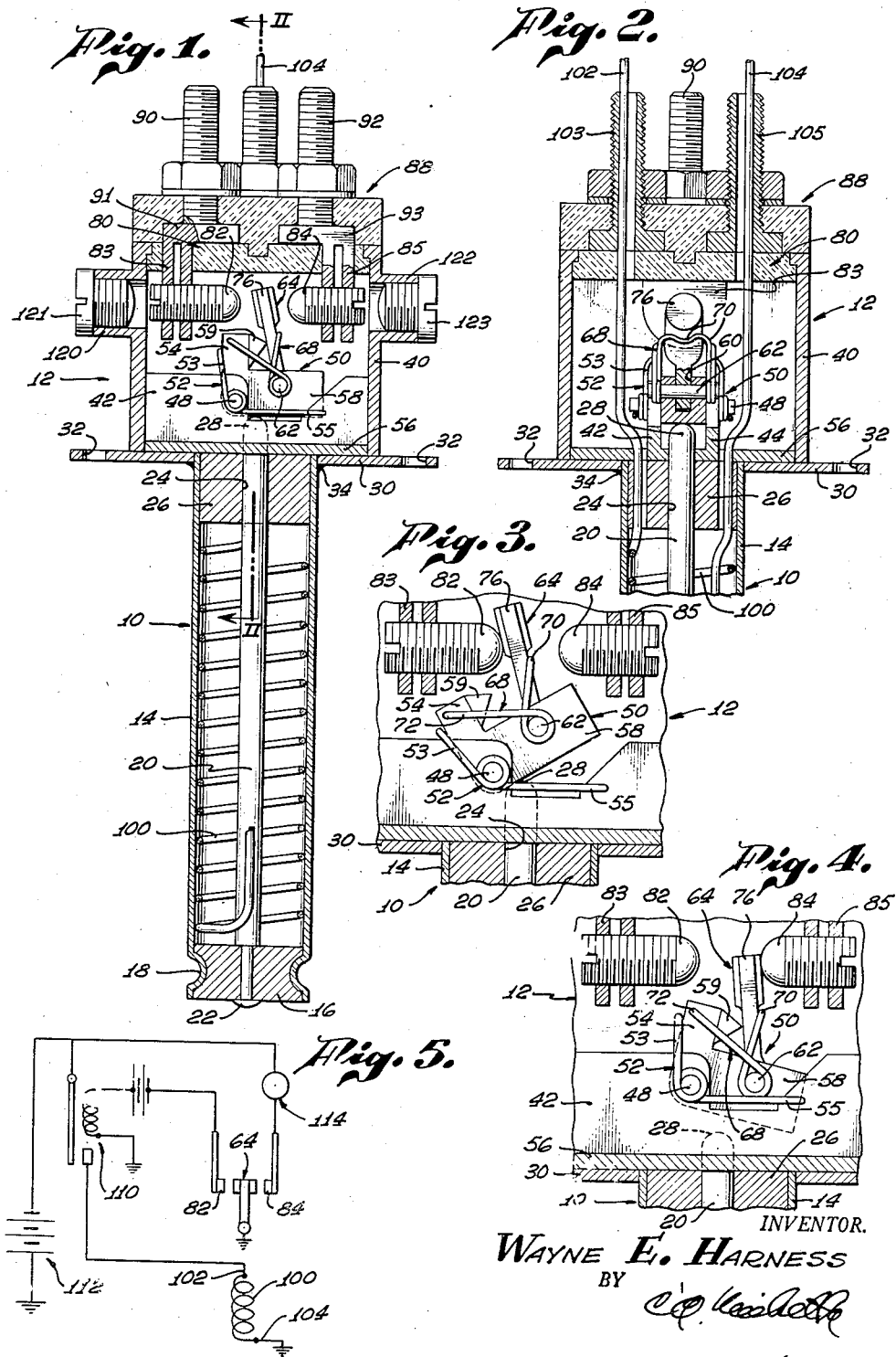
INVENTOR.
WAYNE E. HARNESS
BY
ATTORNEY.

United States Patent Office 2,777,919
Patented Jan. 15, 1957

2,777,919
THERMOSTATIC SWITCH

Wayne E. Harness, North Hollywood, Calif., assignor, by mesne assignments, to Walter Kidde & Company, Inc., Belleville, N. J., a corporation of New York Application January 11, 1954, Serial No. 403,165

12 Claims. (Cl. 200—137)

My invention relates generally to a thermostatic switch and particularly describes such a device adapted for use for relatively wide temperature variations and including means for facilitating quick response of its contact making and breaking elements.

The invention is specifically directed to the provision of a device for detecting a rise in temperature where the ambient may be approximately 1000° F. As is well-known, this condition exists in many industrial equipments and in particular is the normal situation obtaining in modern jet engines as used in aircraft. A typical environment in which the present invention finds valuable application is in the afterburner of a jet engine where the ambient temperature during normal operation is, say, 975° F. If any malfunctioning of the equipment occurs, the temperature may rise within a very short period of time well above a safe temperature for the material exposed thereto, and the switch of this invention may be used to energize an alarm circuit, to cut off fuel supply to the engine or to accomplish other action to prevent damage to the material. For purposes of illustration, it may be assumed that it is desired that the switch respond when the temperature has risen to 1000° F.

The problem is made more acute by reason of the fact that malfunctioning of a jet engine which may lead to dangerously high temperature in the afterburner or other parts is especially likely to occur at the time an engine is started. Just prior to starting, the temperature of the parts may be in the range of 70° F. or thereabouts depending upon weather conditions or other factors. From these conditions, at starting, the temperature to be sensed by the present thermostatic switch may rise within less than ten seconds to its normal operating temperature which has illustratively been assumed as 975° F. If, now, some malfunctioning occurs during starting, the temperature in the afterburner and associated parts of the engine may rise to 1200° F. or higher, which would cause serious and, in most cases, irreparable damage to the engine. Thus, it is necessary that the present device indicate a rise in temperature above the assumed normal of 975° F. well before the movement when the temperature would reach the danger level, and that such indication be given within a few seconds of the starting of a cold engine.

In order to accomplish the objective set forth above, the present invention includes pre-heating means associated with a temperature responsive element in order that such element will always be maintained at a pre-determined temperature when the pre-heating means is actuated. Moreover, the present invention includes means for accommodating unusually large physical movement of the temperature responsive element without impairing the limits of accuracy of temperature control attained.

Thus, the principal object of the present invention is to provide a novel thermostatic switch especially adapted for sensing and quickly responding to small temperature variations from a relatively high ambient.

Another object of the invention is to provide a device of the above character including means for pre-heating the temperature responsive element and for maintaining such element within a pre-determined temperature range.

A further object of the invention is to provide a thermostatic switch including means for accommodating very large movement of the temperature responsive element thereof without impairing accuracy of response.

Still a further object of the invention is to provide, in a thermostatic switch having the characteristics set forth above, means for adjusting the temperatures to which the device is responsive.

These and other and allied objects and purposes of the invention will become clear from a study of the following description of an illustrative embodiment thereof taken in connection with the accompanying drawing in which:

Fig. 1 is a vertical sectional view of a preferred form of the device when the temperature-responsive element is exposed to normal operating temperature and the electric switch is out of contact with both contact members.

Fig. 2 is a fragmentary sectional view taken upon plane II—II of Fig. 1.

Fig. 3 is a fragmentary sectional view on a somewhat enlarged scale of the upper portion of the thermostatic switch of my invention showing the parts in position when the temperature-responsive element is exposed to an ambient temperature lower than normal.

Fig. 4 is a fragmentary sectional view similar to Fig. 3 with the parts in position when the temperature-responsive element is exposed to a temperature above normal operating temperature.

Fig. 5 is a schematic wiring diagram of a typical electrical circuit used in conjunction with the thermostatic switch of my invention.

Referring now to the drawing and first to Fig. 1 thereof, a preferred embodiment of the thermostatic switch of the present invention includes an elongated temperature sensing element indicated generally at 10 and an enlarged upper head indicated generally at 12. The temperature-responsive element 10 includes a hollow tubular casing 14 provided at its lower end with a plug member 16 which may be desirably retained in the position shown by indented or deformed portions 18 of the casing 14. An axially disposed rod 20 extends the entire length of the temperature-responsive element 10, being fastened at its lower end by suitable means 22 to the plug 16. The rod 20 extends upwardly through an axial bore 24 formed in an insert 26 fixed to the upper end of casing 14, the rod 20 being slidably carried in the bore 24. The upper end of the rod 20 desirably terminates in a rounded tip 28.

Suitable mounting means are desirably provided and in the present illustration are shown as including a flanged plate 30 having a number of spaced mounting holes 32 through which suitable screws, bolts or the like may extend for attaching the entire device to a housing or other structure. Both the plate 30 and the casing 14 are desirably made of metal and are permanently attached together as by a weld 34 or other suitable means.

The head 12 includes a body desirably having cylindrical side walls 40 and a pair of transverse members 42 and 44 extending upwardly from base 56 of head 12. A pivot pin 48 is rotatably journaled in a pair of aligned openings formed in the transverse members 42 and 44 and a rocker lever indicated generally at 50 is rotatably carried on the central portion of the pivot pin 48 whereby the rocker lever 50 may be pivoted about such pin relative to the transverse members 42 and 44. Means are provided for resiliently urging the rocker lever 50 clockwise as seen in Figs. 1, 3 and 4 into abutment against the outermost tip 28 of the rod 20. In the present illustration, such means include a resilient wire spring indicated generally at 52 having an arm 53 bearing against an upwardly extending leg 54 of rocker lever 50, the spring 52 having lower legs connectable to the transverse members 42 and 44 by suitable means such as inturned ends of the lower leg 55 of the spring being receivable in bores formed in the transverse members 42 and 44.

Rocker lever 50, in addition to an upwardly projecting leg 54 includes also a leg 58 angularly spaced from the leg 54, and the resilient means 52 is adapted to urge the lower surface of leg 58 downwardly into abutting contact with the outer tip 28 of the rod 20.

Means are provided for pivotally carrying a switch member on the leg 58 of rocker lever 50. In the present illustration, such means are provided by a slot 60 formed in the upper surface of the leg 58 and a pivot pin 62 rotatably journaled in the leg 58 of the rocker lever 50, the pivot pin 62 extending across the slot 60. An electrical switch member indicated generally at 64 is pivotally mounted at its lower end upon the pivot pin 62 and extends upwardly from the leg 58, the axis of pivot pin 62 being parallel to the axis of pivot pin 48. The upwardly extending leg 54 of rocker lever 50 desirably includes an enlarged abutment portion 59, and resilient means are provided for urging the electrical switch 64 counterclockwise about its pivot 62 into abutment against the portion 59 of the rocker lever 50. These resilient means in the present illustration are indicated generally at 68 and include a spring member having a yoke portion 70 bearing against the upper portion of switch 64 and leg means 72 connectable with the leg 54 of rocker lever 50.

Means are provided for effecting electrical contact between the outer end 76 of switch 64 and external circuitry connected to the switch. Desirably two spaced contact members are provided between which the upper end 76 of the switch 64 may move in response to longitudinal movement of the outer tip 28 of the rod 20. Across the top of the head 12 there is a cap member indicated generally at 80 and made of a suitable dielectric material. A pair of electrical contacts 82 and 84 are carried in suitable mounting means 83 and 85 respectively which extend downwardly through holes in the dielectric cap or cover 80. For purposes of adjusting the position of electrical contacts 82 and 84, such contacts are desirably threadedly received in their respective mounting members 83 and 85 so that rotation of each of the contacts 82 and 84 as by a screw driver or similar instrument will achieve the desired adjustability. The contact members 82 and 84 lie in the plane of movement of the switch arm 64, which plane is virtually perpendicular to the axes of pivot pins 48 and 62.

Means are provided for facilitating connection between the contacts 82 and 84 and external circuitry connectable with the switch. A bonnet indicated generally at 88 and made of dielectric material overlies the cover member 80 and has fixed thereto a number of binding posts which extend upwardly from the bonnet. In the present illustration, there are four such binding posts and two of them, 90 and 92, are connected respectively to the upper portions 91 and 93 respectively of the mounting means 83 and 85 carrying the contacts 82 and 84.

Means are provided for maintaining the temperature of temperature responsive member 10 within a predetermined range. In the present embodiment of the invention, such means include a helically disposed coil of wire 100 lying within and in heat transfer relation with the casing 14. The ends of the conductor 100 are brought upwardly as seen in the drawing and extend through bores formed in the other two of the four binding posts carried by the bonnet 88, as best seen in Fig. 2 wherein the end portions of conductor 100 indicated at 102 and 104 are carried in bores of binding posts 103 and 105 respectively. It will be, of course, understood that the conductor 100 throughout its length is insulated by suitable material, the insulation material being desirably such as to facilitate heat transfer between conductor 100 and casing 14. Moreover, it will be understood that one end of conductor 100, as 104, may be grounded, and for simplicity this will be assumed to be the case in describing the illustrative circuit diagram in Fig. 5.

In Fig. 5 is shown an electrical schematic diagram of typical circuitry of which the thermostatic switch of the present invention is a part. As there shown, the electrical conductor 100 terminates at 102 and 104 and a normally open relay indicated generally at 110 is adapted to permit current flow through conductor 100 from power source 112 when energized. The electrical switch 64 and electrical contacts 82 and 84 shown in Fig. 5 correspond to those previously referred to in connection with the description of the other figures. Movement of switch 64 leftwardly as seen in the figures causes contact with contact member 82 which in turn actuates relay 110 to closed position, thus energizing the conductor 100. Movement of switch 64 rightwardly as seen in the figures makes contact with contact member 84 and thereby energizes an alarm or similar means generally indicated at 114. It will be understood that the alarm 114 may itself include circuitry well-known in the art for automatically taking corrective action for the higher temperature which its energization indicates, such as automatically closing the fuel supply in the case of a jet engine.

Operation

The linear temperature expansion coefficients of casing 14 and of rod 20 must be different in the construction of a switch in accordance with the present invention. Desirably, the expansion coefficient of rod 20 is very small or even zero, and I therefore prefer to use a ceramic or similar material having an extremely low temperature coefficient of expansion. The material of casing 14 is so chosen as to provide a relatively high linear temperature expansion coefficient. Thus, it will be understood that when casing 14 is inserted into a medium having a high temperature, the length of the casing 14 will be increased so that its lower or inner end moves downwardly as seen in Fig. 1. The rod 20, having a smaller linear temperature expansion coefficient and furthermore not being in as intimate contact with the hot fluid medium as casing 14, undergoes very little, if any, expansion. Since the inner end of rod 20 is fixedly carried by the plug 16 on the inner end of casing 14, the rod as a whole moves downwardly. This downward movement may continue to the position shown in Fig. 4 wherein rocker lever 50 has moved clockwise under the influence of resilient means 52 until electrical contact member 76 is forced into contact with contact member 84. As will be seen by referring to Fig. 5, such contact as is illustrated in Fig. 4 results in energization of the alarm 114 whereupon necessary corrective action may be taken.

When the temperature of a fluid medium surrounding casing 14 falls below a pre-determined value, the rod 20 is moved upwardly so that the operative elements of the switch assume the position shown in Fig. 3. Under these conditions, again by reference to Fig. 5, it will be seen that the contact made between the members 76 and 82 energizes normally open relay 110 and thus impresses electrical power from source 112 upon the conductor 100. The resultant heat generated in conductor 100 is transferred to casing 14 thus causing linear expansion of the latter member and lowering rod 20 and its tip 28 to the normal position shown in Fig. 1 wherein switch 64 is not in contact with either contact member 82 or 84.

It will now be seen that the present device is extremely quick acting. When used in connection with a jet engine, as heretofore referred to, the danger of serious damage to the parts caused by excessive temperature in the afterburner may be avoided by, prior to starting the engine, energizing the coiled conductor 100 within casing 14. The coil being thus energized, casing 14 is quickly raised in temperature to a value equal to or slightly below the normal operating temperature which should exist in the fluid medium surrounding casing 14. The parts will thus be maintained in slowly reciprocating movement between the positions shown in Figs. 1 and 3 by reason of the inverse feedback characteristic of the circuitry. When the engine is started and the temperature rises a few degrees above the point at which the situation of Fig. 3 exists, the casing 14 is prepared to immediately respond to any further temperature increase which would mean danger if not immediately corrected.

Desirably the head 12 constitutes a virtually air tight enclosure to protect the interior chamber or cavity, and the parts disposed therein, from dirt and corrosion. Means are provided in the side walls of head 12 to permit access to the contact members 82 and 84, such means being here shown as including a pair of bosses 120 and 122 and removable closure members 121 and 123 respectively which are threadedly received in the bosses. The bosses 120 and 122 are aligned with the contact members 82 and 84, and the contact members may thus be easily adjusted for any desired calibration of the switch by rotating the contact members as by a screw driver or similar tool. Moreover, it will be observed that movement of the switch arm 64 beyond that necessary to make contact with the respective contact members 82 and 84 does not result in strain or deformation of the parts. If the temperature of the casing 14 greatly exceeds its design value so that the tip 28 of rod 20 is drawn downwardly away from contact with the leg of rocker lever 50 (as in Fig. 4), the electrical switch 64 is merely held in contact with contact member 84 by reason of the resiliency of spring means 52. Similarly, when the temperature of casing 14 is very low so that the upper tip 28 of rod 20 extends well upwardly (as shown in Fig. 3), the electrical switch 64 is nevertheless held in contact with contact member 82 without deforming of the parts by reason of the resiliency of spring means 68.

Modifications and changes from the preferred form of the invention herein shown and described by way of illustration may be made without departing from the spirit thereof. All such modifications and changes are intended to be embraced within the scope of the appended claims.

I claim:

1. In a thermostatic switch: an elongated tubular temperature responsive member having its outer end provided with means for attachment to a support and its inner end adapted to extend into a fluid whose temperature is to be measured; an axially extending rigid rod disposed within said member having an inner end fixed to said inner end of the member and its outer end projecting outwardly of the member and being longitudinally movable relative thereto, the member and the rod having different temperature expansion coefficients; means for heating said member, said heating means being in heat transfer relation with virtually the entire length of the member; and means controlled by longitudinal movement of the outer end of said rod for energizing said heating means when the outer end of the rod is in one predetermined position and for de-energizing said heating means when the outer end of the rod is in another predetermined posion.

2. The invention as stated in claim 1 wherein the temperature expansion coefficient of the rod is virtually zero.

3. The invention as stated in claim 1 wherein the temperature expansion coefficient of said member is substantially greater than that of said rod.

4. The invention as stated in claim 1 wherein said heating means includes an electric conductor carried by said member and in heat transfer relation therewith and a source of electric power connectable to said conductor.

5. The invention as stated in claim 4 wherein said energizing and de-energizing means includes an electric switch actuated by longitudinal movement of the outer end of said rod.

6. A thermostatic switch including: support means; a rocker lever pivotally carried by said means including a rocker leg; means longitudinally movable relative to said support means in response to temperature changes of a medium and abuttable against said leg; resilient means urging said leg into abutting contact with the longitudinally movable means; a pair of spaced electric contact members carried by said support means; an electric switch arm having one end pivotally connected to said leg about an axis spaced from and parallel to the axis of pivotal connection between the lever and support means and the other end disposed between said contact members and contactable with one or the other thereof, the contact members lying in a plane perpendicular to said axes; means carried by the rocker lever and abuttable against said arm at a point intermediate the ends of the arm; and resilient means for urging said arm against said last named means, the two said resilient means being biased to urge the lever and arm in opposite directions of rotation about their respective axes.

7. The invention as stated in claim 6 wherein said longitudinally movable means includes an elongated tubular metallic member having its outer end fixed to said support means and its inner end extending into a medium whose temperature is to be sensed.

8. The invention as stated in claim 7 including electrical means for heating said tubular member and means controlled by contact of the switch arm with one of said contact members for energizing said electrical heating means.

9. A thermostatic switch for mounting upon a support housing comprising: temperature responsive means including an elongated tubular metallic member having its outer end adapted to be carried on a housing and its inner end projecting into a fluid medium whose temperature is to be sensed, and a rigid rod extending longitudinally within the tubular member having its inner end fixed to the inner end of the tubular member and its outer end projecting outwardly of and longitudinally movable relative to the outer end of the tubular member, the tubular member and rod having dissimilar temperature expansion coefficients; an outer head fixed to the outer end of the tubular member and provided with an interior chamber receiving the outer end of the rod; a rocker lever within said chamber pivotally connected to the head about an axis transverse to and spaced from the axis of longitudinal movement of said rod, the lever including a first leg extending into the path of movement of said rod and a second leg angularly spaced from the first; resilient means urging said first leg into abutting contact with the outer end of said rod; a pair of spaced electrical contact members carried by said head within the chamber lying in a plane perpendicular to said pivotal axis; a switch arm having its one end pivotally connected to said first leg about an axis parallel to the first named pivotal axis and its other end disposed for movement in said plane between said contact members, said other end being adapted to contact one or the other of said contacts when the outer end of said rigid rod assumes predetermined positions in response to temperature change of said tubular member; resilient means urging said arm into abutment against said second leg; and electrical means for heating said tubular member including means energized when said switch arm is in contact with one of said contact members in response to movement of the outer end of the rod caused by relatively low temperature of the tubular member.

10. In a thermostatic switch: an elongated hollow temperature responsive member projecting inwardly into a fluid whose temperature is to be sensed, the outer surface being exposed to the fluid; a rigid elongated rod within the member, the inner end of the rod being fixed to the inner end of the member, the member and rod having different temperature expansion coefficients; heating means fixed to the inner surface of said member; and means controlled by longitudinal movement of the outer end of the rod for energizing said heating means when the rod is in one position and for de-energizing said heating means when the rod is in another position.

11. The invention as stated in claim 10 wherein said heating means include an electrical resistive element extending virtually the entire length of said member.

12. The invention as stated in claim 10 wherein the temperature expansion coefficient of the rod is virtually zero.

References Cited in the file of this patent

UNITED STATES PATENTS

| | | |
|---|---|---|
| 1,594,022 | Smith | July 27, 1926 |
| 1,686,286 | McCabe | Oct. 2, 1928 |
| 2,423,693 | Eaton | July 8, 1947 |
| 2,493,456 | Kaser | Jan. 3, 1950 |